(12) United States Patent
Ferreira Sanches Lopes et al.

(10) Patent No.: US 12,514,813 B2
(45) Date of Patent: Jan. 6, 2026

(54) TERPENE-CONTAINING COMPOSITION AND ITS COSMETIC USE

(71) Applicant: Beraca Ingredientes Naturais Ltda, Levilandia (BR)

(72) Inventors: Stephanie Ferreira Sanches Lopes, São Paulo (BR); Bruna Aline Da Silva Merigiolli, São Paulo (BR); Daniel Nose Sabara, São Paulo (BR); Maria Célia Hibari Reimberg, São Paulo (BR); Naiara Andrade Herculin, São Paulo (BR); Robson José Da Silva Cruz, Levilandia (BR)

(73) Assignee: Beraca Ingredientes Naturais Ltda, Ananindeua PA (BR)

( * ) Notice: Subject to any disclaimer, the term of this patent is extended or adjusted under 35 U.S.C. 154(b) by 491 days.

(21) Appl. No.: 17/996,150

(22) PCT Filed: Apr. 14, 2021

(86) PCT No.: PCT/BR2021/050151
§ 371 (c)(1),
(2) Date: Oct. 13, 2022

(87) PCT Pub. No.: WO2021/207813
PCT Pub. Date: Oct. 21, 2021

(65) Prior Publication Data
US 2023/0210758 A1 Jul. 6, 2023

(30) Foreign Application Priority Data

Apr. 15, 2020 (EP) .................................... 20169551

(51) Int. Cl.
| | | |
|---|---|---|
| *A61Q 19/00* | (2006.01) | |
| *A61K 8/31* | (2006.01) | |
| *A61K 8/36* | (2006.01) | |
| *A61K 8/9789* | (2017.01) | |
| *A61P 17/00* | (2006.01) | |
| *A61Q 19/08* | (2006.01) | |

(52) U.S. Cl.
CPC .............. *A61K 8/9789* (2017.08); *A61K 8/31* (2013.01); *A61K 8/361* (2013.01); *A61Q 19/00* (2013.01); *A61K 2800/10* (2013.01); *A61K 2800/75* (2013.01)

(58) Field of Classification Search
CPC ........ A61K 8/9789; A61K 8/31; A61K 8/361; A61K 2800/10; A61K 2800/75; A61Q 19/00
See application file for complete search history.

(56) References Cited

U.S. PATENT DOCUMENTS

2016/0074312 A1* 3/2016 Msika .................. A61Q 19/005
435/68.1

FOREIGN PATENT DOCUMENTS

WO WO-2019136105 A1 * 7/2019 ............. A61K 36/18

OTHER PUBLICATIONS

Veiga, V.F., Rosas, E.C., Carvalho, M.V., Henriques, M.G.M.O., Pinto, A.C. "Chemical composition and anti-inflammatory activity of copaiba oils" J. Ethnopharm. 112, pp. 248-254. (Year: 2007).*

* cited by examiner

*Primary Examiner* — Frederick F Krass
*Assistant Examiner* — Toriana N. Vigil
(74) *Attorney, Agent, or Firm* — Weatherly IP Solutions, LLC; Karen P. Bechtold; James Weatherly

(57) ABSTRACT

The present invention relates to a composition comprising beta-caryophyllene, alpha-humulene, and linoleic acid. Moreover, the present invention refers to a composition comprising a blend of one or more oils from the genus *Copaifera* and one or more oils from the genus *Passiflora*. The present invention further relates to a cosmetic product comprising such composition. Furthermore, the present invention relates to a method for preparing such composition and to the use of the composition or the cosmetic product of the present invention for reducing inflammatory responses.

10 Claims, No Drawings

TERPENE-CONTAINING COMPOSITION AND ITS COSMETIC USE

CROSS REFERENCE TO RELATED MATTER

The present application claims priority to PCT Application No. PCT/BR21/050151, as filed on Apr. 14, 2021 and EPO Application No. 20169551.7, as filed on Apr. 15, 2020, the entire contents of both applications are incorporated herein by reference for all purposes.

The present invention relates to a composition comprising beta-caryophyllene, alpha-humulene, and linoleic acid. Moreover, the present invention refers to a one or more oils from the genus *Passiflora*. The present invention further relates to a cosmetic product comprising such composition. Furthermore, the present invention relates to a method for preparing such composition and to the use of the composition or the cosmetic product of the present invention for reducing inflammatory responses.

The skin is the biggest organ of the human body. It is significant for communication to the external environment and has a large variety of functions. It is composed by three layers: epidermis (external surface), dermis and hypodermis. The epidermal layer is formed by keratinized cells that are in constant renewal and has, as main function, the formation of a solid barrier which protects the skin tissue. A healthy skin is composed by a well-balanced integumentary system, formed by the constant regeneration of the epidermal layer—replacement of keratinized dead cells for new cells—added to the dermal layer functionality, in which most of the cellular processes occur.

A series of aesthetic changes (wrinkles and hyperchromic) and cutaneous disorders (contact and atopic dermatitis, alopecia, psoriasis, vitiligo, among others), in general, are related to deviations in the activity of immune mediators. When measuring these changes, epidermal cells eventually will secrete (either constitutively or by activation) several cytokines (pro and anti-inflammatory) that supports the idea that the skin is an immunocompetent organ, playing the fundamental role as an immune barrier.

An undesired effect in the skin is inflammation. Inflammation may lead to undesired redness, itching and swelling. Inflammation is a discomfort to the skin. Unfortunately, many cosmetic ingredients can lead to a secretion of pro-inflammatory cytokines, such as, e.g., interleukin 1 beta (IL-1$\beta$), interleukin 6 (IL-6), indicating an inflammation. Such hyperactivity is intended to be avoided.

The inflammatory process is triggered by the inter-relationship of different agents acting on both epidermal and dermal tissues as skin microenvironment, external and internal agents, immune system, natural and individual features, stressful factors, among others. As a result of the inflammatory process, a variety of inflammatory cytokines including interleukin 1 beta (IL-1$\beta$), interleukin 6 (IL-6), are activated, as well as the increase of vascular permeability, vasodilation and leucocytes migration, histamine release, and inflammatory activator cascades related to the inflammatory process as COX (cyclooxygenase) and LOX (lipoxygenase), enzymes that signal the inflammatory process. The skin presents a swollen aspect, reddish, sensitive, and with discomfort sensation, therefore.

Sensitive skin is often caused by the reactivity of the skin to environmental conditions including external and/or inner factors. Such factors may include immunological and/or individual susceptibility. The prevalence of reported sensitive skin worldwide is considered to be rather high, depending on the definition often in a range of approximately 14% throughout population.

If any rupture of the epidermal or dermal barrier occurs, the inflammatory process is initiated and is signalized by different cytokines. Cytokines are polypeptides or extracellular and water-soluble glycoproteins, which originated in cascade through target cell stimuli. The cytokines activation makes direct reactions with receptors in the body, and they activate certain cell messengers, that promote the gene transcription as the consequent response to the inflammatory process.

In particular, the interleukins IL-1$\beta$ and IL-6 may be produced by a number of nucleated cell types, including at dermal and epidermal levels, and they are important markers and flags for the start of an inflammatory process, particularly IL-6 that occurs in damaged tissues under chronic conditions. IL-1$\beta$ may be produced by macrophages, monocytes, fibroblasts, and endothelial cells through barrier rupture processes, as cell infection, invasion and inflammation and it is actively secreted by cells, originating a systemic inflammation due to COX2 (cyclo-oxygenase-2) activation. IL-6 is a glycopeptide that may be secreted by macrophages, monocytes, eosinophils, hepatocytes, and glia cells. Besides signalizing the acute inflammatory process, it is responsible for the maturation and activation of neutrophils and macrophages, as well as lymphocytes-T differentiation. It is known that this interleukin is secreted by senescent cells (built up during the aging process), which may cause pathogenic conditions.

There is a near relationship between skin, immune and nervous system, known as the skin immuno-endocrinological system. This defense system presents epidermis and dermis with intensive activities that deliver a series of hormones and neurotransmitters (neuropeptides), including beta-endorphin.

In the human organism, there is the endocannabinoid system which is formed by a net of lipidic signals to modulate both neural and inflammatory functions through a bidirectional interaction with different receptors. In this system there is the endocannabinoid receptor CB2 (CB2 receptor) which may interfere with immunomodulatory and inflammation processes in the skin. The CB2 receptor is activated by endogenous (endocannabinoids) or exogenous ligands (generally agonists). Activating the CB2 receptor may lead to an increase of beta-endorphin secretion. Beta-endorphins are neuropeptides which are locally produced in the skin due to the cutaneous immune response. Beta-endorphins are peptides formed by 31 amino acids and produced in the brain, present in skin cells and delivered to opioid receptors. These compounds are considered as being rather resistant to enzymatic degradation and act directly on the immune system. One of the main effects of beta-endorphins in the body is its analgesic effect. Particularly for skin cells, beta-endorphins production is directly related to comfort, calm, and relaxing sensation, and involved in the tissue's re-epithelization (also: reepithelization), recovery and skin healing. The maintenance of skin homeostasis may be supported. Beta-endorphin may be produced at a neuronal level, including in the skin. In an indirect way, the CB2 receptor may also modulate the answer on opioid receptor and may release beta-endorphin at dermal and epidermal levels. Due to cellular stress according to inflammatory answers, the cosmetic ingredient of the present invention often acts to release less pro-inflammatory cytokines in order to promote the homeostasis of the skin tissue and return to balance. Potentially, stimulation of the CB2 receptor may also inhibit toll-type receptors and influence innate immune processes.

There is the need for cosmetically usable compositions including cosmetic products (also cosmetic ingredients) that avoid skin irritation, in particular on sensitive skins. Further, some users prefer natural ingredients for such purpose. It is particularly desirable to provide cosmetically usable compositions including cosmetic products that maybe even and/or modulate the internal conditions of the skin's self-defense.

Some positive effects can be achieved by using extracts from hemp (*Cannabis sativa*). This has, however, the significant drawback that many hemp (*Cannabis*) extracts, in particular those containing cannabinoids such as tetrahydrocannabinol (THC) and cannabidiol (CBD) have undesired systemic activity. Thus, *Cannabis*-based products are strictly regulated in numerous states and partly not accredited for cosmetic use.

Accordingly, there is still an unmet need for further means that decrease inflammatory effects, improve skin sensation and skin healing that are (essentially) free of tetrahydrocannabinol (THC) and preferably of other *Cannabis*-based components.

Surprisingly, it has been found that a combination of beta-caryophyllene, alpha-humulene and linoleic acid as well as a blend of oils of the genus *Copaifera* and the genus *Passiflora* lead to a desired effect of decreasing undesired inflammatory effects in skin cells and improving skin healing. The composition also bears a positive skin sensation.

In a first aspect, the present invention relates to a composition comprising or consisting of:
A. 45 to 80% by weight (based on the composition) of beta-caryophyllene as component A;
B. 8 to 15% by weight (based on the composition) of alpha-humulene as component B;
C. 5.5 to 8% by weight (based on the composition) of linoleic acid as component C; and optionally
D. 0 to 41.5% by weight (based on the composition) of one or more other components which are different from (A), (B) and (C) and which are miscible with (A), (B) and (C) as component D.

The composition of the present invention may be usable as a cosmetic ingredient with a unique composition of sesquiterpenes, other terpenes and fatty acids used for sensitive skin. It may be used as calming, relaxing and/or soothing agent. The components may have a synergistic effect due to the action of linoleic acid that enhances the skin permeability and consequent production of beta-endorphin in the skin, in epidermal and dermal levels.

Without being bound to this theory, the composition may allow the soothing and calming effect to the skin according to the action in receptor CB2 in a sustainable way, including anti-inflammatory action as indicated by a decreased formation of inflammation markers (also: biomarkers) such as interleukins interleukin 1beta (IL-1β, interleukin 1β, IL-1beta) and interleukin 6 (IL-6).

The terms "beta-caryophyllene", "β-caryophyllene", and the abbreviation "BCP" may be understood interchangeably. Beta-caryophyllene may also be "(−)-β-caryophyllene", "(1R,4E,9S)-4,11,11-Trimethyl-8-methylidenebicyclo [7.2.0]undec-4-ene" or "trans-(1R,9S)-8-Methylene-4,11,11-trimethylbicyclo[7.2.0]undec-4-ene" Beta-caryophyllene may also be an isomer thereof. Beta-caryophyllene may be understood as a natural bicyclic sesquiterpene. In one embodiment, beta-caryophyllene is obtainable (or obtained) from one or more essential oils. In one embodiment, beta-caryophyllene may be obtainable (or obtained) from one or more plant parts. In one embodiment, beta-caryophyllene may be obtainable (or obtained) from one or more plant parts of one or the genus selected from the group consisting of the genus *Copaifera* (e.g., *Copaifera officinalis*), the genus *Piper* (e.g. *Piper nigrum*), the genus Syzygium (e.g, Syzygium aromatic), the genus *Cannabis* (e.g., *Cannabis sativa*), rosemary, the genus *Humulus* (e.g., *Humulus lupulus* (hops)), and combinations of two or more thereof. In a preferred embodiment, beta-caryophyllene may be obtainable (or obtained) from one or more plant parts of one or the genus selected from the group consisting of the genus *Copaifera* (e.g., *Copaifera officinalis*), the genus *Piper* (e.g. *Piper nigrum*), the genus Syzygium (e.g, Syzygium aromatic), rosemary, and hops. In a preferred embodiment, beta-caryophyllene is not from *Cannabis sativa*. In an embodiment, beta-caryophyllene is partly or completely of synthetic origin. Beta-caryophyllene has been found to be a phyto-cannabinoid which may modulate cell signs and, consequently, may attenuate inflammatory effects. As used herein, the terms "*Copaifera*" and "*Copaiba*" may be used interchangeably. Beta-caryophyllene may be considered as an exogenous phyto-cannabinoid.

The terms "alpha-humulene", "humulene", "α-caryophyllene", may be understood interchangeably. Alpha-humulene may also be "2,6,6,9-Tetramethyl-1,4-8-cycloundecatriene" or "3,7,10-Humulatriene". Alpha-humulene is a monocyclic sesquiterpene. In one embodiment, it is obtainable (or obtained) from one or more essential oils. In one embodiment, alpha-humulene may be obtainable (or obtained) from one or more plant parts. In one embodiment, alpha-humulene may be obtainable (or obtained) from one or more plant parts of one or the genus selected from the group consisting of the genus *Copaifera* (e.g., *Copaifera officinalis*), the genus *Piper* (e.g. *Piper nigrum*), *Humulus* (e.g., *Humulus lupulus* (hops)), and combinations of two or more thereof.

In one embodiment, alpha-humulene may be obtainable (or obtained) from one or more plant parts of one or the genus selected from the group consisting of the genus *Copaifera* (e.g., *Copaifera officinalis*), the genus *Piper* (e.g. *Piper nigrum*), *Humulus* (e.g., *Humulus lupulus* (hops)), and combinations of two or more thereof. In a preferred embodiment, alpha-humulene is not from *Cannabis sativa*. In an embodiment, alpha-humulene is partly or completely of synthetic origin.

Linoleic acid is present in human foodstuff. Linoleic acid may enhance permeability through the skin. Linoleic acid may enhance permeability at stratum corneum. Linoleic acid may enhance permeability through all three layers of the skin. This may improve activity of components (A) and (B). Linoleic acid is a fatty acid with double unsaturated chain, known as omega-6. It may be or natural (in particular plant) origin (e.g., *Passiflora edulis* origin) or may be obtained synthetically.

For instance, the component D may be any other component or mixture of components which are different from (A), (B) and (C) and which is miscible with components (A), (B) and (C) or a mixture of two or more thereof. In this context, the term "is miscible with" may be understood in the broadest sense as a component which is miscible with components (A), (B) and (C) at the concentration it is comprised in the composition of the present invention. Thus, a component of a low miscibility/solubility can still be present in the sense of the present invention as far as the concentration is sufficiently low. Component D may be or contain one or more other components selected from the group of, but not limited to, one or more sesquiterpenes other than components (A) and (B), one or more fatty acids other than component (C), one or more fats, one or more other terpenes, one or more steroid hormones (e.g., cholesterol), and one or more other oily components (e.g. such contained in the natural sources of any one of the components (A) and/or (B) and/or optionally (C) and/or optionally (D) are obtainable (or obtained) from.

For example, component D may optionally further comprise or consist of one or more further sesquiterpenes and/or other terpenes. For example, the composition of the present invention may contain one or more sesquiterpenes and/or other terpenes selected from the group consisting of, but not limited to, delta-elemene, alpha-copaene, beta-elemene, trans-alpha-bergamotene, alpha-bergamothene, bergamothene, germacrene, germacrene-D, gamma-elemene, beta-bisabolene, delta-cardinene, bicyclogermacrene, aromadendrene, caryophyllene oxide, alpha-armophene, linolenic acid, oleic acid, stearic acid, palmitic acid, and combinations of two or more thereof.

Additionally or alternatively, component D may optionally also comprise water and/or one or more salts. It will be understood that the salts, if present, are preferably cosmetically acceptable salts. Additionally or alternatively, component D may optionally also comprise other ingredients which are obtained from one or more plants from which the components (A), (B) and/or (C) are obtained from.

Additionally or alternatively, component D may optionally also comprise one or more antioxidants, preservatives and/or vitamins. In this context, vitamins are preferably lipophilic vitamins such as vitamins E, D, K and/or A. For example, component D may comprise tocopherol (vitamin E) as an antioxidant.

Beta-endorphin may also be designated as β-endorphin and maybe understood as generally understood in the art. It may be an endogenous opioid neuropeptide and peptide hormone that may be secreted by neurons within the central nervous system and peripheral nervous system. Typically, beta-endorphins comprise 31 consecutive amino acid moieties and may be produced in the brain. Beta-endorphin may be present in skin cells. The respective receptors binding to beta-endorphin such as e.g., opioid receptors (e.g., gamma-opioid receptor (also: γ-opioid receptor (e.g., $\mu_1$-opioid receptor, $\mu_2$-opioid receptor, and/or $\mu_3$-opioid receptor))) may be present in several cell types. Beta-endorphin may be considered as a marker for pleasant sensation.

The composition of the present invention may comprise 45.0 to 80.0% by weight of beta-caryophyllene (component A). In a preferred embodiment, the composition of the present invention comprises 46 to 78% by weight, or 47 to 76% by weight, or 48 to 74% by weight, of 49 to 72% by weight, or 50 to 70% by weight, of beta-caryophyllene (component A). The composition of the present invention may comprise 50 to 55% by weight, or 50 to 60% by weight, or 55 to 60% by weight, or 55 to 70% by weight, or 60 to 75% by weight, or 60 to 70% by weight, or 65 to 70% by weight, of beta-caryophyllene (component A).

The composition of the present invention may comprise 8.0 to 15.0% by weight, or 8 to 10% by weight, or 9 to 11% by weight, or 10 to 12% by weight, or 11 to 13% by weight, or 12 to 14% by weight, or 13 to 15% by weight, of alpha-humulene (component B). he composition of the present invention may comprise 5.5 to 8.0% by weight, or 6.0 to 8.0% by weight, or 6.5 to 7.0% by weight, or 6.5 to 7.5% by weight, or 7.0 to 7.5% by weight, or 7.0 to 8.8% by weight, or 7.5 to 8.8% by weight, of linoleic acid (component C).

The composition of the present invention may comprise 0 to 41.5% by weight, or 0 to 1% by weight, or 0 to 2% by weight, or 0 to 5% by weight, or 0 to 10% by weight, or 5 to 15% by weight, or 10 to 20% by weight, or 15 to 25% by weight, or 20 to 30% by weight, or 25 to 35% by weight, or 30 to 40% by weight, of one or more other components which are different from (A), (B) and (C) and which are miscible with (A), (B) and (C) (component D). The composition of the present invention may optionally also consist of components (A), (B) and (C) and may thus also be (essentially) free of further components such as component D.

The composition of the present invention may be a cosmetic ingredient. It may be made from physical or chemical methods. Such method may include evaporation, steam distillation, molecular distillation, cold mechanical press, heated press and chemical extraction.

An aspect of the present invention relates to a composition comprising or consisting of a blend of:
(a) one or more oils from the genus *Copaifera* as component (a) and
(b) one or more oils from the genus *Passiflora* as component (b)

Such composition may also be considered as an amazon oil blend.

In a preferred embodiment, the composition of the present invention comprises or consists of a blend of:
(a) one or more oils from the genus *Copaifera* as component (a); and
(b) one or more oils from the genus *Passiflora* as component (b), wherein said composition is further characterized in that it comprises or consists of:
(A) 45 to 80% by weight (based on the composition) of beta-caryophyllene as component A;
(B) 8 to 15% by weight (based on the composition) of alpha-humulene as component B;
(C) 5.5 to 8% by weight (based on the composition) of linoleic acid as component C; and optionally
(D) 0 to 41.5% by weight (based on the composition) of one or more other components which are different from (A), (B) and (C) and which are miscible with (A), (B) and (C) as component The composition of the present invention may be a topical product containing or consisting of a blend of one, two or more amazon oils with beta-caryophyllene, alpha-humulene, and linoleic acid, optionally further containing one or more other sesquiterpenes and/or one or more fatty acids. Beta-caryophyllene, and optionally alpha-humulene, may optionally interact with the endocannabinoid receptor CB2 when applied to human or an animal (e.g., human or animal skin) or cells comprising such endocannabinoid receptor CB2. Beta-caryophyllene and/or alpha-humulene may act as an agonist of the endocannabinoid receptor CB2. Beta-caryophyllene and/or alpha-humulene may bear anti-inflammatory activity. Without being bound to this theory, the anti-inflammatory effect may result from the increase beta-endorphin production.

The composition may promote skin repair. Beta-caryophyllene and/or alpha-humulene may increase of beta-endorphin production when applied to human or an animal (e.g., human or animal skin) or cells which are able to secrete beta-endorphin. Beta-caryophyllene and/or alpha-humulene may promote skin repair. The composition of the present invention may bear synergistic action due to enhancement of skin permeation in the presence of linoleic acid. Without being bound to this theory, the stimulation of the CB2 receptor may also inhibit toll-type receptors (e.g., toll-like receptors) and influence innate immune processes. Without being bound to this theory, inhibition of toll-type receptors may lead to pro-inflammatory cytokines expression, and an optionally persistent anti-inflammatory activity is achieved.

The ratio of the component (a) and (b) may be in any range. In a preferred embodiment, the weight ratio of components (a):(b) is in the range of from 80:20 to 98:2.

In a further preferred embodiment, the weight ratio of components (a):(b) is in the range of from 90:10 to 98:2.

In further embodiments, the weight ratio of components (a):(b) is in the range of from 82:18 to 96:4, or is in the range of from 84:16 to 95:5, or is in the range of from 86:14 to 94:6, or is in the range of from 88:12 to 92:8, or is in the range of from 89:11 to 91:9, or in the range of (approximately) 90:10.

For example, the weight ratio of components (a):(b) is in the range of 90.0:10.0, or in the range of 92.5:7.5, or in the range of 91.5:8.5, or in the range of 90.5:9.5.

For example, the composition may consist of one of the following;
90.0% by weight of *Copaiba* oil and 10.0% by weight of Passion fruit oil;
92.5% by weight of *Copaiba* oil and 7.5% by weight of Passion fruit oil;
91.5% by weight of *Copaiba* oil and 8.5% by weight of Passion fruit oil; or
90.5% by weight of *Copaiba* oil and 9.5% by weight of Passion fruit oil.

Component (a) may be any oils from the genus *Copaifera* (also: copaiba plant). In a preferred embodiment, the component (a) is oil from *Copaifera officinalis*.

Component (b) may be any oils from the genus *Passiflora* (also: passion fruit plant). In a preferred embodiment, the component (b) is oil from *Passiflora edulis*.

In a preferred embodiment, component (a) is oil from *Copaifera officinalis* and component (b) is oil from *Passiflora edulis*.

The present invention may also be based on the blend of amazon oils composed by *Copaifera officinalis* resin oil and *Passiflora edulis* seeds oil.

The components (a) and (b) may be obtainable (or obtained) from any plant part. In an embodiment of the present invention these are obtainable (or obtained) from a plant or part thereof selected from the group consisting of the whole plants, leaves, stems, resin, seeds, roots, flowers and a combination or two or more thereof, which can each be fresh or dried materials or a combination thereof. The components (a) and (b) may be high quality of oils. If plants or plant parts are intended to be used in a dried form, drying may be performed by any means such as, e.g. by means of drying by sun heating and/or by one or more other technologies including dried heat or by infrared technology. Optionally, the plants or plant parts may also be subjected to one or more further process technologies.

In a preferred embodiment, component (a) is a seed oil, a resin oil or a combination thereof. In a preferred embodiment, component (b) is a seed oil, a resin oil or a combination thereof. In a preferred embodiment, at least one of the components (a) and (b) is a seed oil, a resin oil or a combination thereof.

In a preferred embodiment, both components (a) and (b) are each a seed oil, a resin oil or a combination thereof.

In a preferred embodiment, component (a) comprises at least one resin oil. In a preferred embodiment, component (a) is at least one resin oil. In a preferred embodiment, component (a) is at least one resin oil from *Copaifera officinalis*

In a preferred embodiment, component (b) comprises at least one seed oil. In a preferred embodiment, component (b) is at least one seed oil. In a preferred embodiment, components (b) comprises at least one seed oil from *Passiflora edulis*.

In a preferred embodiment, component (a) comprises at least one resin oil and component (b) comprises at least one seed oil. In a preferred embodiment, component (a) is at least one resin oil and component (b) is at least one seed oil. In a preferred embodiment, component (a) is at least one resin oil from *Copaifera officinalis* and components (b) comprises at least one seed oil from *Passiflora edulis*.

The composition of the present invention may be used as such or may be mixed with one or more further ingredients to obtain a cosmetic product.

Accordingly, a further aspect of the present invention relates to a cosmetic product comprising or consisting of:
(I) 0.1 to 100% by weight (based on the cosmetic product) of a composition of the present invention; and optionally
(II) 0 to 99.9% by weight (based on the cosmetic product) of one or more cosmetically acceptable carriers, filers, or combinations of carriers and fillers; and optionally
(III) 0 to 50% by weight (based on the cosmetic product) of one or more further cosmetically acceptable additives, in particular selected from the group consisting of fragrances, dyes, pigments, emulsifiers, lubricants, chelating agents, acidity regulators, antimicrobial agents, preservatives, antioxidants, and combinations of two or more thereof.

It will be understood that the definitions and preferred embodiments made in the context of the composition of the present invention mutatis mutandis apply to the cosmetic product of the present invention.

The cosmetic product may be a formulation containing the cosmetic agent of the present invention as a cosmetic ingredient such as, e.g., as odorizing agent. Deleterious effects in the skin may be reduced or avoided, according to the safety studies and legal requirements. It will be understood that a "cosmetic product" as used herein may be but does not need to be a (e.g., commercial) product for direct (cosmetic) use. It can also be understood as a cosmetic ingredient that may be mixed with other cosmetically and/or pharmaceutically acceptable ingredients.

In a preferred embodiment, the cosmetic product is a cosmetic product for external topical use on the skin. It may be usable or used in all types of skin.

The composition product of the present invention and the cosmetic product of the present invention may have topical compatibility and preferably has (essentially) no irritation potential, also when applied to human or animal skin ("in vivo" or "in situ"). Preferably, there is (essentially) no primary skin irritation, (essentially) no cumulative skin irritation, (essentially) no skin sensitization, (essentially) no primary photo irritation, (essentially) no cumulative photo irritation, and/or (essentially) no photosensitization. Preferably, there is (essentially) no primary skin irritation at all.

Preferably, the composition product of the present invention and the cosmetic product of the present invention may have a pleasant sensation and/or odor. The cosmetic ingredients of the present invention may be applied topically in different types of cosmetic products (also: cosmetic formulations).

In a preferred embodiment, the cosmetic product is selected from the group consisting of emulsions, gels, ointments, tonics, liquid soaps, bar soaps, bath oils, shower oils, massage oils, makeups, scalp treatments, aftershaves, shaving products, deodorants, shower gel, shampoos, and combinations of two or more thereof.

As an example, a cosmetic product (of the present invention as such or comprising a cosmetic product of the present invention) may be a (sprayable) mist containing or consisting of: qs.100% by weight, glycerin (1.5% by weight); allantoin (0.10% by weight), menthol (0.10% by weight); β-caryophyllene, α-humulene and linoleic acid (2.0% by weight); hydrogenated castor oil (10.0% by weight); alcohol alkoxylate (10.0% by weight); sorbitan caprylate and benzyl alcohol (1.5% by weight); fragrance (0.50% by weight).

As another example, the cosmetic product may be a soothing oil containing or consisting of: β-caryophyllene, α-humulene and linoleic acid (60.0% by weight); propylene glycol di-heptanoate (10.0% by weight); squalene (1.0% by weight); tocopherol (1.0% by weight).

Each of the components (A), (B), (C) and, optionally, (D) as described above may be each independently from another obtained from any source. Each of the components may be obtained from a commercial supplier, may be synthesized, or may be obtained from natural sources.

Likewise, the one or more oils from the genus *Copaifera* (component (a)), the one or more oils from the genus *Passiflora* (component (b)), or both may be each independently from another obtained from any source. Each of the components may be obtained from a commercial supplier, may be synthesized, or may be obtained from natural sources.

As used herein, the term "one or more oils" may be also understood as "one or more types of oils". This means that optionally a mixture of two or more different (types of) oils of the indicated (plant) genus or species may be used as a component.

The composition of the present invention may be obtained by any means, including physical and/or chemical methods.

A further aspect of the present invention relates to a method for preparing a composition of the present invention, comprising the steps of or consisting of the steps of:
(i) providing plant parts of the genus *Copaifera* and plant parts of the genus *Passiflora*;
(ii) distilling the plant parts to obtain one or more oils for each genus;
(iii) mixing the one or more oils from the genus *Copaifera* the one or more oils from the genus *Passiflora* and optionally one or more further components which are miscible with said oils.

It will be understood that the definitions and preferred embodiments made in the context of the composition and the cosmetic product of the present invention mutatis mutandis apply to the method for preparing such composition.

A plant part of step (i) may be plant part containing oils. In a preferred embodiment, a plant part of step (i) is selected from the groups consisting of the whole plants, leaves, stems, resin, seeds, roots, flowers and a combination or two or more thereof. In a preferred embodiment, a plant part of step (i) is selected from resin and seeds and a combination or two or more thereof.

Such plant part may be fresh or (partly or completely) dried materials or a combination thereof. When dried matter is used, the respective plant parts (e.g., seeds) may be collected, selected and dried. This may be performed by any means such as, e.g., in the sun, in an oven (e.g., in a vacuum oven).

In a preferred embodiment, a resin of *Copaifera* is used. In a preferred embodiment, seeds of *Passiflora* are used. In a preferred embodiment, a resin of *Copaifera* and seeds of *Passiflora* are used.

An unpurified (also: crude or raw) resin oil (e.g., an unpurified *Copaiba* resin oil) may be an exudate obtainable (or obtained) by means of trunk tree excision and the collection of the amorphous mass formed as resin.

An unpurified (also: crude or raw) seed oil (e.g., an unpurified *Passiflora* seed oil) may be cold press of the seeds. This may be performed by any means of any press. This may, exemplarily performed by means of a hydraulic press. The plant material may optionally also be grinded before or concomitant to pressing.

Before step (ii), there may optionally be an step of obtaining the unpurified oil of each plant part used in step (i) by any means such as, e.g., a method selected from the group consisting of cold press (e.g., at a temperature in the range of 4 to <30° C., or 15° C. to 25° C., or 18° C. to 22° C.), pressing at heat (e.g., at a temperature in the range of 30° C. to 300° C., or 40° C. to 90° C., or 50° C. to 150° C., or 80° C. to 120° C.), extraction by means of one or more chemical solvents (e.g., organic solvents), and combinations of two or more thereof. Also, a temperature profile such as, e.g., 25-100-300° C. may optionally be used.

The preparation of the unpurified oil may contain partition between solvents of several polarities. For this purpose, one or more organic solvents may be used such as, e.g., those selected from the group consisting of, but not limited to, acetone, ethanol, hexane, dichloromethane, methyl-ethyl-ketone. These may be combined with each other and/or with an aqueous phase. After these solvents obtaining of the oil fraction, with the use of fractioned column (or molecular distillation) or by evaporation process, the final compound may be obtained.

The distilling step (ii) may be performed by any means and at any temperature suitable to obtain the respective oil. In a preferred embodiment, steam distillation is used. A steam distillation is based on the extraction by steam and it may carry a variety of volatile compounds according to their respective boiling points. The steam may carry the respective volatile compounds until the relationship of equilibrium and the generated steam is condensed. The temperature of the process may be increased during distillation. It may be increased in arrange of from 60° C. to 300° C., in particular 70° C. to 250° C., at ambient pressure. The temperature may be lower when the pressure under which distillation is performed in decreased. The temperature may be increased during the course of distillation. Such increase may be (essentially) linear, exponential, converging to a maximal temperature, may be stepwise, or any combination thereof or other type of gradient. Distillation is typically followed by the liquid condensation (distilled liquid), according to the physical separation between the generated vapor and the distilled liquid. Distillation may be molecular distillation or fractioned distillation.

The process may comprise segregation such as, e.g., made by fractioning distillation, by successive vaporization and condensation. With the use of fractioning column, simultaneous vaporization with condensation processes in the same unit of processing may be achieved. The molar relationship of the steam flow and the formed liquid may be optionally defined according to the height of the column and the temperature of distillation that allows the concentration of compounds (as for example beta-caryophyllene and/or alpha-humulene and/or linoleic acid) in order to compose the final oil.

In a preferred embodiment, step (ii) comprises distilling at a temperature range of 50 to 300° C. In a preferred embodiment, step (ii) comprises distilling at a temperature range of 100 to 300° C., or of 110 to 290° C., or of 120 to 280° C., or of 125 to 270° C., or of 130 to 270° C., or of 135 to 260° C., or of 140 to 250° C., or 100 to 200° C., or of 110 to 190° C., or of 120 to 180° C., or of 125 to 170° C., or of 130 to 170° C., or of 135 to 160° C., or of 140 to 150° C.

In a preferred embodiment, step (ii) of distilling comprises steam distilling conducted at a temperature range of between 50 and 300° C. or between 100 and 300° C. In a preferred embodiment, step (ii) of distilling comprises steam distilling conducted at a temperature range of 100 to 300° C., or of 110 to 290° C., or of 120 to 280° C., or of 125 to 270° C., or of 130 to 270° C., or of 135 to 260° C., or of 140 to 250° C., or 100 to 200° C., or of 110 to 190° C., or of 120 to 180° C., or of 125 to 170° C., or of 130 to 170° C., or of 135 to 160° C., or of 140 to 150° C.

When performing steam distilling, the volatile compounds may be diffused to the steam. Depending on the set up of the aperture used, these may be dragged in an upward vertical direction in the distillation column.

The distillation step (ii) may also comprise removal of highly volatile compounds (e.g., aldehydes, ketones and free fatty acids) from the oil. Such process may optionally comprise a step of deodorization of the oil in a heated environment.

In step (ii), the product may be evaporated or may be a residual in the vessel from which more volatile compounds are removed.

Optionally, the distillation step (ii) may be conducted at ambient pressure or a vacuum. For example pressure may be in the range of from 0.01 to 1200 hPa, or of from 0.1 to 1150 hPa, or of from 0.5 to 1100 hPa, or of from 1 to 1050 hPa, or of from 10 to 1040 hPa, or of from 100 to 1030 hPa, or of from 200 to 1020 hPa, or of from 500 to 1015 hPa, or of from 933.26 to 1013.25 hPa, or of from 900 to 1020 hPa, or of from 200 to 1000 hPa, or of from 300 to 900 hPa, or of from 100 to 800 hPa.

For example, *Copaifera* resin oil may be obtained by steam distillation at an increasing temperature of from 120 to 260° C., in particular 140 to 250° C., at a pressure in the range of 900 to 1020 hPa.

For example, *Passiflora* seed oil may be obtained by deodorizing the oil at a temperature in the range of 130 to 170° C., in particular 140 to 150° C., at a pressure in the range of 900 to 1020 hPa to remove volatile contaminants.

The distillation step (ii) may be optionally repeated twice, three times, four times, five times, or more often.

Optionally, the oil obtainable (or obtained) from step (ii) may optionally be subjected to one or more further steps. Such further step may include such as oil bleaching. The oil obtainable (or obtained) from step (ii) may optionally subjected to one or more adsorbent compounds such as, e.g., diatomaceous earth. This may reduce the content of phospholipids and/or colorant materials (e.g., chlorophyll). Optionally, in such step heat and/or vacuum may be used to improve incorporation of the oil in the diatomaceous earth and finally removal therefrom.

Additionally or additionally, such further step may include filtration (e.g. with a pore size in the range of from 10 to 1000 µm, or of from 50 to 500 µm, or of from 60 to 400 µm, or of from 70 to 300 µm, or of from 80 to 200 µm, or of from 90 to 175 µm, or of from 100 to 150 µm. Filtration may also include crossflow filtration. Filtration may be performed at any pressure such as, e.g., ambient pressure, a vacuum at the target side or an elevated pressure at the feed side.

Optionally, one or more further ingredients such as one or more antioxidants (e.g., tocopherol) and/or preservatives may be added to improve storability. Optionally, each oil may be stored at suitable conditions. It may, optionally, be bottled under nitrogen. It may optionally be stored in the dark.

In a preferred embodiment, the method further contains a step of mixing one or more oils with one or more organic solvents in which the one or more oils are solved and separating the one or more organic solvents from the one or more oils.

The method may optionally include one or more further steps such as, e.g., those selected from the group consisting of steam distillation, fractioning distillation, evaporation, cold mechanical press, heated press, extraction by means of one or more organic solvents, extraction based on different partition coefficients in different phases, other physical extraction, other chemical extraction, and combinations of two or more thereof.

The obtained composition may optionally be collected, identified, segregated, and/or identified, and/or analyzed according to the available technology known in the art.

The step (iii) of mixing the mixing the one or more oils from the genus *Copaifera* the one or more oils from the genus *Passiflora* and optionally one or more further components which are miscible with said oils may be performed by any means. It may be performed in a blender, a stirrer, by manual stirring or shaking.

The composition of the present invention may be obtained. Then, optionally, one or more further ingredients such as one or more antioxidants (e.g., tocopherol) and/or preservatives may be added to improve storability. Optionally, the composition of the present invention may be stored at suitable conditions. It may, optionally, be bottled under nitrogen. It may optionally be stored in the dark.

The composition of the present invention may act through immunological skin inflammation in general attenuating the symptoms.

The present invention may also refer to application for cosmetic ingredients (such as the composition of the present invention or the cosmetic product of the present invention) for use on/in sensitive skin. Sensitive skin may be considered as an irregular condition that tends to be associated with several issues regarding the skin aspect including rash, itch redness, dryness, and discomfort. This may be useful due to its anti-inflammatory activity (e.g., decrease of IL-1β and IL-6) and/or comfort for skin due to the production of beta-endorphin.

The composition of the present invention or the cosmetic product of the present invention may be used for any purpose.

A further aspect of the present invention relates to the use of the composition of the present invention or the cosmetic product of the present invention for reducing inflammatory responses, in particular inflammatory responses of the skin.

In other words, the present invention also refers to a method for reducing inflammatory responses, in particular inflammatory responses of the skin, in a subject, comprising the step of administering said subject, in particular said subject's skin, with a sufficient amount of an the composition of the present invention or the cosmetic product of the present invention.

It will be understood that the definitions and preferred embodiments made in the context of the composition and the cosmetic product and the method for preparing such composition of the present invention mutatis mutandis apply to the use of such composition or cosmetic product as well as a method for reducing inflammatory responses applying such composition or cosmetic product.

There may be a synergistic effect of the components which may be result from maximization of results on subject's skin and/or in an in vitro (also: ex vivo application in cultured (e.g., human cells), with enhancement of anti-inflammatory properties. This may be evidenced by, e.g., observing a decrease of IL-1β and IL-6 production. This may help skin repair. There may further be (optionally indirect) beta-endorphin production. The activity may promote a soothing and relaxing effect to skin.

As used in the context of the present invention, the term "subject" may be understood in the broadest sense as any human or animal who/which may be administered with the composition or cosmetic product of the present invention. Preferably, it refers to a human or animal whose/which skin the composition or cosmetic product of the present invention can be administered to. The subject may be healthy or may suffer from a disease such as, e.g., an inflammatory disease. In a preferred embodiment, the subject is a human or a mammal (e.g., a domestic mammal such as a dog, a cat, a horse, a donkey, a cow, a pig, etc.). In a preferred embodiment, the subject is a human. The subject may also be designated as "individual", "patient" or the like.

The composition of the present invention or the cosmetic product of the present invention may be used as calming, relaxing and/or soothing agent. It may be a helper in skin repair. The composition product of the present invention and the cosmetic product of the present invention may be used for all types of skin, including, but not limited to scalp and hair, and could be used in different body surface, as face skin, scalp, hands, feet, beard face, and sensitive skin in general.

The composition of the present invention or the cosmetic product of the present invention may have activity on anti-inflammatory cytokines. The decrease of inflammation is indicated by the decreasing levels of pro-inflammatory markers (also: biomarkers) such as interleukin 1-beta (IL-1β), interleukin 6 (IL-6). Thus, in a preferred embodiment, the level of inflammatory cytokines, in particular decreasing levels of interleukin 1 beta (IL-1β), interleukin 6 (IL-6), or both is reduced. Optionally, the composition of the present invention and the cosmetic product of the present invention bear anti-inflammatory activity due to enhancement of skin permeability.

As used herein, the "level" may be understood as the secreted level of the respective marker. Alternatively, it may also refer to the expression level.

Additionally or alternatively, the composition of the present invention or the cosmetic product of the present invention may have activity on the maintenance or increasing of production of beta-endorphins, in particular in the skin. Thus, in a preferred embodiment, the level of beta-endorphin is increased.

Activity of the endocannabinoid receptor CB2 may interfere with the immunological answer and may decrease undesired inflammation, in particular of the skin.

In a preferred embodiment, the level of inflammatory cytokines, in particular decreasing levels of interleukin 1 beta (IL-1β), interleukin 6 (IL-6), or both is reduced, and the level of beta-endorphin is increased. The IL-1β may be processed by epidermal and dermal cells associated on injuries to the cutaneous tissue and other tissues. IL-6 may also be found on senescent cells and may be activated as an inflammatory answer according to the type of tissue. It also may be released due to the aging of the skin cells.

For these cytokines, the consequent decrease of them will attenuate the effects of inflammation, as redness, itching and swelling. The cosmetic ingredient can be used for sensitive skin with calming and soothing properties.

As used herein, the terms "inflammatory cytokines" and may be understood in the broadest sense as any (pro-inflammatory) marker (also: biomarker) that indicates an inflammation. Without being bound to this theory, the probable mechanism of action may be based on the endocannabinoid receptor CB2 activation by phyto-cannabinoid exogenous beta-caryophyllene that may bind to the receptor CB2 and then may trigger a series of reactions with other ligands as an inflammatory answer due to the activity on the inflammation cascade by the enzymes cyclooxygenase (COX) and lipoxygenase (LOX). The activity of COX and LOX may be decreased and the response of the production of interleukins IL-1β and IL-6 may be lowered.

The use of the present invention may also include re-epithelization. The composition or the cosmetic product of the present invention may also be used for maintaining beauty. The composition or the cosmetic product of the present invention may help to mitigate the effects of premature aging related to inflammatory stress and it can support the re-epithelization and healing process. The composition or the cosmetic product of the present invention may bear wellness and de-stressing properties. The composition or the cosmetic product of the present invention may bear various skin benefits such as calming, improved healing activity and providing comfort. The composition or the cosmetic product of the present invention may also promote an anti-inflammatory activity that may support the healing and re-epithelization of the skin and/or may promote cutaneous wellbeing due to recovery and/or maintain (neuroimmunologic) homeostasis.

It will be understood that in preferred embodiments, if not defined differently, the percentages (%) of the components typically refer to the respective composition or cosmetic product in which these are present. In preferred embodiments, the respective composition or cosmetic product may also consist of the enlisted components. Then, the percentages (%) may sum up to 100%.

If not defined differently, the percentages (%) refer to weight percentages.

If not defined differently, the numeric values may be understood in the broadest sense as values rounded to the last depicted decimal. For example, a value of 10 may include al values from ≥9.5 to <10.5. This also applies to a single value as well as to a range. The disclosure, however, also includes definitions that the value is not rounded, in particular when used as a range.

The following examples illustrate the invention further, but do not limit the scope of the invention. The scope of the invention is defined by the claims.

EXAMPLES

Example 1—Preparation and Technical Effects of a Composition of the Present Invention Material and Methods Part of the Plant Use for the Generation of Oil

*Copaiba officinalis* oil was obtained from the resin of *Copaiba officinalis*. In the present example, the resin was an exudate obtained by means of trunk tree excision and the collection of the amorphous mass formed as resin. This can also be considered as resin oil The part of the plant used for obtaining *Passiflora edulis* oil is based on the seeds of the Passion fruit (*Passiflora edulis*). This can also be considered as seed oil.

Obtaining Oils from the Plant Part

The procedure for obtaining standardized vegetable oils experimentally used herein comprises several steps including as extraction (by physical process), purification and standardization in order to obtain reproducible and quality oils batch by batch.

The extraction of *Copaifera officinalis* resin oil was obtained based by means of steam distillation. The extraction was performed by means of direct and constant heating (increasing temperature from 140 to 250° C.) of the *Copaifera officinalis* resin to its boiling point, forming steam under a controlled pressure of approximately 700 to 760 mmHg (933.26 to 1013.25 hPa)). The volatile compounds were diffused to the steam and they were dragged in an upward vertical direction in the distillation column. This cycle was repeated several times and in top of the column, the more volatile compounds were condensed. On the base of column, the compounds which bear higher boiling points (i.e., less volatile compounds) were collected. Finally, these compounds were condensed and collected in a vessel, obtaining a composition of volatile and fixed compounds in a liquid form. This provided the *Copaifera officinalis* resin oil. The process was finished after homogenization by means of adding tocopherol to the oil in order to keep the oxidative stability of the product and finally, the oil was bottled under nitrogen.

Regarding passion fruit oil, the extraction process was performed by means of cold press of the seeds. Alternatively, it can be performed by batch or continuous (expeller) extraction. The seeds were collected, selected and dried (in the sun or in vacuum oven). The drying was perpetuated until an appropriate residual mass (approximately 10%) was maintained in order to keep the quality of seeds and the oil to be pressed accordingly. A hydraulic press was used at room temperature to obtain the *Passiflora edulis* seed oil by applying mechanical pressure on the seeds on an endless shaft that grind the seeds. The (fixed) oil (product of the extraction) was released. Subsequently, the oil was subjected to the process of purification ("oil bleaching"). This was performed by means of adsorbent compounds, herein used: diatomaceous earth. The process comprised decreasing phospholipids and colorant materials (as example chlorophyll) that degrade the oil due to the oxidation process with a consequent darkening and loss of quality. After diatomaceous earth adding (use of heat and vacuum in order to a better incorporation) to the oil, the generated product was filtered by mechanical press with the using of filtering elements (generally paper) with pore size (grammage) of about 100 to 150 μm. The purification process was performed by a deodorization of the oil at a temperature in the range of 140 to 150° C.) at a pressure of 700 to 760 mmHg (933.26 to 1013.25 hPa). Volatile compounds (aldehydes, ketones and free fatty acids) were vaporized and thereby removed from the oil. Finally, due to the loss of antioxidant elements of the oil during the process, tocopherol was added to keep the oxidative stability and finally the oil was bottled under nitrogen.

The purified *Copaifera officinalis* resin oil (a) obtained from the above process and the *Passiflora edulis* seed oil (b) were mixed in a weight ratio of components (a):(b) of 90:10. This provided the composition of the present invention which is designated as "Blend of Oils" in the below experiments.

It was found that this composition of the present invention which is designated as "Blend of Oils" contained mostly beta-caryophyllene (50 to 70% by weight) and further 8 to 15% by weight of alpha-humulene, 5.5 to 8% by weight of linoleic acid and less than 36.5% of further ingredients such as mainly other sesquiterpenes, other terpenes, fatty acids and tocopherol.

Experimental Procedure Assays Based on Human Cell Culture

In an in vitro (also: ex vivo) model system to simulate in effects in vivo, i.e., a human skin culture, the effects of the composition of the present invention on non-irritated and irritated skin were determined. For this purpose, the established pro-inflammatory markers IL-1β and IL-6 as well as the marker for a pleasant sensation beta-endorphin were detected Experimental Design The skin culture was treated with the composition of the present invention (Blend of Oils) and stimulated with lipoteichoic acid (LTA) for inflammatory microenvironment induction. The protein synthesis of interleukins IL-1β and IL-6 and synthesis of beta-endorphin were measured by standard enzyme-linked immunosorbent assay (ELISA).

Material

Human skin culture was obtained from skin fragments derived from an abdominoplasty from a healthy woman (58 years old). After surgery the skin fragments were collected in plastic bags containing an isotonic 0.9% saline solution and kept on freeze for up to 24 hours. The use of human skin fragments from elective surgeries for the study was performed in agreement with the Ethics Committee in Research.

Skin Fragments Protocol

Skin fragments were fractioned into pieces of about 1.5 $cm^2$ and incubated in culture medium. Then, the fragments were treated once a day during three consecutive days with the composition of the present invention (Blend of Oils) at 25±2 μL/$cm^2$ and rub for 30 seconds. Immediately after the third day treatment, the skin culture was concomitantly stimulated with 100 μM lipoteichoic acid (LTA) for the inflammatory microenvironment induction. The treated skin culture was kept in an incubator at 37° C. in the presence of 5% (v/v) of $CO_2$ for 72 hours. After this incubation, the fragments were collected for determining the levels of the markers. Tissue homogenate was prepared Quantification of IL-1β, IL-6 and β-endorphin in the tissue homogenate were performed by means of a standard enzyme-linked immunosorbent assay (ELISA), using a kit from R&D systems (Phoenix Pharmaceuticals, Inc., USA). The absorbance measurement was evaluated at 450 nm in Monochromator Multiskan GO (Thermo Scientific). Values were normalized by the total proteins of the sample, measured by a routine Bradford assay.

Statistical analysis was performed by means of an ANOVA test, with measurement of variance of results and comparison of results between groups. Subsequently, a post-test according to Bonferroni was performed to confirm results presented by ANOVA test. Level of significance used: 5% (Graph Pad Prism v.6).

Results

The effect of the composition of the present invention (Blend of Oils) on the reduction of production of pro-inflammatory markers (exemplified as IL-1β and IL-6) as well as the recovery and increase of production of beta-endorphin in human skin culture (in vitro) was investigated. In particular such effects were investigated when the human skin culture is stimulated with a skin irritating stimulus (exemplified as lipoteichoic acid (LTA)). The results are depicted in Tables 1 to 3 below.

TABLE 1

Effect of the composition of the present invention (blend of oils) on the reduction of production of IL-1β in human skin culture stimulated with lipoteichoic acid (LTA). Herein, the IL-1β (pg/mg of protein) is depicted.

|  | Control | Stimulated with LTA | Blend of Oils | Blend of Oils + LTA | Reduction of IL-1β by cells stimulated with LTA |
|---|---|---|---|---|---|
|  | 9.199 | 32.525 | 6.052 | 14.971 | 54.0 |
|  | 8.759 | 38.033 | 6.595 | 15.011 | 60.5 |
|  | 7.501 | 35.934 | 9.024 | 17.494 | 51.3 |
| Average (pg/mg) | 8.486 | 35.497 | 7.223 | 15.825 | 55.4 |
| Deviation | 0.881 | 2.78 | 1.582 | 1.445 |  |

It was found that the composition of the present invention (blend of oils) slightly decreased IL-1β in human skin culture which was not stimulated with an irritating stimulus. In case the skin culture is stimulated with the irritating stimulus lipoteichoic acid (LTA), IL-1β production increased by 4.18-fold ($p<0.001$). The treatment with the composition of the present invention was surprisingly capable to avoid the exacerbated production of TIL-1β ($p<0.001$), decreasing its production in 55.42% when compared to the group stimulated with LTA. These values represent a protection rate when compared to the control group of 72.830.

TABLE 2

Effect of the composition of the present invention (blend of oils) on the reduction of production of IL-6 in human skin culture stimulated with lipoteichoic acid (LTA). Herein, the IL-6 (pg/mg of protein) is depicted.

|  | Control | LTA | Blend of Oils | Blend of Oils + LTA | Reduction of IL-6 by cells stimulated with LTA |
|---|---|---|---|---|---|
|  | 169.568 | 246.178 | 156.861 | 205.365 | 16.6 |
|  | 184.419 | 309.501 | 163.872 | 200.212 | 35.3 |
|  | 173.12 | 274.234 | 185.845 | 214.941 | 21.6 |
| Average (pg/mg) | 175.702 | 276.638 | 168.86 | 206.84 | 25.2 |
| Deviation | 7.755 | 31.73 | 15.122 | 7.474 | — |

It was found that the composition of the present invention (Blend of Oils) slightly decreased IL-6 in human skin culture which was not stimulated with an irritating stimulus. In case the skin culture is stimulated with the irritating stimulus lipoteichoic acid (LTA), IL-6 production increased by 1.57-fold ($p<0.001$). The treatment with the composition of the present invention was surprisingly capable to avoid the exacerbated production of IL-6 ($p<0.001$) decreasing its production in 25.23% when compared to the group stimulated with LTA. These values represent a protection rate when compared to the control group of 69.15%.

TABLE 3

Effect of the composition of the present invention (Blend of Oils) on the recovery and increase of production of beta-endorphin in human skin culture stimulated with lipoteichoic acid (LTA). Herein, the beta-endorphin (pg/mg of protein) is depicted.

| B-endorphin (pg/mg of protein) | | | | | |
|---|---|---|---|---|---|
|  | Control | LTA | Blend of Oils | Blend of Oils + LTA | Increase of beta-endorphin by cells stimulated with LTA |
|  | 15.273 | 8.683 | 28.068 | 16.671 | 92.0 |
|  | 14.493 | 7.341 | 22.955 | 19.456 | 165.0 |
|  | 14.435 | 10.912 | 25.876 | 15.833 | 45.1 |
| Average (pg/mg) | 14.734 | 8.979 | 25.633 | 17.32 | 92.9 |
| Deviation | 0.468 | 1.804 | 2.565 | 1.896 |  |

It was found that the composition of the present invention (blend of oils) increased beta-endorphin to 173.98% in human skin culture which was not stimulated with an irritating stimulus. In case the skin culture is stimulated with LTA, beta-endorphin production decreased by 39.06% ($p<0.001$). The treatment with the composition of the present invention was surprisingly capable to Increase its production by 92.90% when compared to the group stimulated with LTA. These values represent a protection of rate about 100% of the control group and an even higher stimulation, which is desirable due to a particularly good skin sensation.

The composition of the present invention (blend of oils) was surprisingly found to be able to act on the skin inflammatory response control, with a significant 55.4% and 25.2% reduction in the inflammatory interleukins IL-1β and IL-6 respectively, besides a 92.9% significant increase of beta-endorphin stimulus.

In summary, it was found that the composition of the present invention is surprisingly beneficial for decreasing inflammation (exemplified by the pro-inflammatory markets IL-1β and IL-6) and surprisingly beneficial for stimulating desirable beta-endorphin release. Thus, these results indicate an anti-inflammatory activity that favors both skin healing and re-epithelization. The skin sensation (also: skin feeling, skin feel) on the composition is particularly beneficial as well. Thus, the composition of the present invention and a product comprising such can promote an anti-inflammatory activity that may support the healing and re-epithelization of the skin and may promote cutaneous wellbeing due to recovery and/or maintain neuroimmunology homeostasis.

Example 2—Complementary Tests on Effects of a Composition of the Present Invention in Comparison to Other Cosmetic Agents The composition of the present invention ("Blend of Oils") is prepared as described in Example 1 above.

In an in vitro (also: ex vivo) model system to simulate in effects in vivo, i.e., a human skin culture, the effects of the composition at different concentrations of the present invention on non-irritated and irritated skin are determined when in comparison with other compounds, as CBD (cannabidiol, at different concentrations) and alpha-bisabolol (at different concentrations). For this purpose, the established pro-inflammatory markers IL-1β and IL-6 as well as the marker for a pleasant sensation beta-endorphin are evaluated together with the present invention, and the positive control, the solvent control, and the untreated control.

Experimental Design

The skin culture is treated with the composition of the present invention (Blend of Oils in different concentrations) and also with other compounds known as anti-inflammatory activity agent such as alpha-bisabolol (at different concentrations) and CBD (cannabidiol, at different concentrations). When in contact with lipoteichoic acid (LTA), an inflammatory microenvironment induction occurs. The protein synthesis of interleukins IL-1β and IL-6 and synthesis of beta-endorphin are measured by standard enzyme-linked immunosorbent assay (ELISA) and values are compared.

Material:

Human skin culture is obtained from skin fragments derived from an abdominoplasty from a healthy person. After surgery the skin fragments are collected in plastic bags containing an isotonic 0.9% saline solution and kept on freeze for up to 24 hours. The use of human skin fragments from elective surgeries for the study is performed in agreement with the Ethics Committee in Research.

Skin Fragments Protocol

Skin fragments are fractioned into pieces of about 1.5 cm$^2$ and incubated in culture medium. Then, the fragments are treated once a day during three consecutive days with the composition of the present invention (Blend of Oils), as well other fragments in contact with alpha-bisabolol (at 5%) and CBD (at 3 and 5%) at 25±2 µL/cm$^2$ and rub for 30 seconds. Immediately after the third day treatment, each skin culture concomitantly is stimulated with 100 µM lipoteichoic acid (LTA) for the inflammatory microenvironment induction. Each treated skin culture is kept in an incubator at 37° C. in the presence of 5% (v/v) of $CO_2$ for 72 hours. After this incubation, the fragments are collected for determining the levels of the markers. Tissue homogenate is prepared with each composition.

Quantification of IL-1β, IL-6 and β-endorphin in each tissue homogenate are performed by means of a standard enzyme-linked immunosorbent assay (ELISA).

The first experiments indicate that the composition of the present invention (Blend of Oils) leads to technical effects which are widely comparable with alpha-bisabolol and CBD (cannabidiol). This particularly refers to an anti-inflammatory action as can be indicated by the decrease of the anti-inflammatory markers IL-1β and IL-6.

Furthermore, there are indications that a constant production of beta-endorphin is stimulated by the composition of the present invention (Blend of Oils) even at lower concentrations. This supports the finding that the composition of the present invention is beneficial for wellness formulations. It can be beneficial for skin recovery as well the use for sensitive skin.

Based on the results, it is possible to observe also the beneficial effect to have a composition including specific fatty acids from *Passiflora edulis*, to keep the constant absorption of the components, favoring the skin healing.

In summary, also these findings indicate that the composition of the present invention is beneficial for decreasing inflammation (exemplified by the pro-inflammatory markets IL-1β and IL-6) and for stimulating desirable beta-endorphin release. The composition of the present invention is particularly beneficial for a cosmetic product having anti-inflammatory activity and promoting cutaneous wellbeing. Compounds such as alpha-bisabolol and CBD (cannabidiol) can be avoided and replaced by the composition of the present invention. This allows the reduction of undesired side effects while maintaining the desired beneficial effects

The invention claimed is:

1. A composition comprising of:
   (A) 45 to 80% by weight of beta-caryophyllene as component A;
   (B) 8 to 15% by weight of alpha-humulene as component B;
   (C) 5.5 to 8% by weight of a permeation enhancer consisting of linoleic acid as component C; and optionally
   (D) 0 to 41.5% by weight of one or more other components which are different from (A), (B) and (C) and which are miscible with (A), (B) and (C) as component D.

2. The composition of claim 1, wherein said composition further comprises a blend of:
   a) resin oil of the genus *Copaifera officinalis* as component (E); and
   b) seed oil of *Passiflora edulis* as component (F).

3. The composition of claim 2, wherein the weight ratio of components (E):(F) is in the range of 80:20 to 98:2.

4. A cosmetic product comprising:
(I) 0.1 to 100% by weight of a composition of claim 2, and optionally
(II) 0 to 99.9% by weight of one or more cosmetically acceptable carriers, fillers, or combinations of carriers and fillers; and optionally
(III) 0 to 50% by weight of one or more further cosmetically acceptable additives, selected from the group consisting of fragrances, dyes, pigments, emulsifiers, lubricants, chelating agents, acidity regulators, antimicrobial agents, preservatives, antioxidants, and combinations of two or more thereof.

5. The cosmetic product of claim 4, which is a cosmetic product for external topical use on the skin.

6. The cosmetic product of claim 4, wherein said cosmetic product is selected from the group consisting of emulsions, gels, ointments, tonics, liquid soaps, bar soaps, bath oils, shower oils, massage oils, makeups, scalp treatments, aftershaves, shaving products, deodorants, shower gel, shampoos, and combinations of two or more thereof.

7. A method for preparing a composition of claim 2 comprising the steps of:

(i) providing resin of the genus *Copaifera officinalis* and seed of *Passiflora edulis*;
(ii) distilling the resin to obtain resin oil of the genus *Copaifera officinalis* and distilling the seed to obtain seed oil from the *Passiflora edulis* wherein the distilling comprises steam distilling conducted at a temperature range of between 100 and 300° C.;
(iii) mixing the resin oil from the genus *Copaifera officinalis* the seed oil from the *Passiflora edulis* and optionally one or more further components which are miscible with said oils.

8. A method for reducing inflammatory responses of the skin by a topical application of the composition of claim 2, wherein for further increasing the level of beta-endorphin production in the skin.

9. The composition of claim 2 wherein when applied to the skin, the composition reduces inflammatory responses of the skin, mitigates the effects of premature aging, and supports re-epithelization of the skin.

10. The composition of claim 9, wherein the reduced inflammatory responses of the skin improves skin comfort and promotes cutaneous wellbeing.

* * * * *